United States Patent Office 2,815,376
Patented Dec. 3, 1957

2,815,376

PRODUCTION OF UREA IN GRANULAR FORM

Robert Ellis Knowlton, Ian Archibald Macgregor, and Peter Evans, Norton-on-Tees, England, assignors to Imperial Chemical Industries Limited, London, England, a corporation of Great Britain No Drawing. Application April 18, 1955,
Serial No. 502,184

Claims priority, application Great Britain May 5, 1954

1 Claim. (Cl. 260—555)

The present invention relates to the production of granular urea and particularly of substantially pure urea in granular form.

Several processes have already been proposed for the production of urea in granular form with the aid of small quantities of diluent and/or binding materials such as chalk, gypsum and starch. The disadvantage of these prior processes is that the added diluent and/or binding materials constitute impurities in the urea which is therefore rendered unsatisfactory for many purposes.

According to the present invention there is provided a process for the production of substantially pure urea in granular form which comprises introducing into an agitated mass of substantially dry particulate urea a concentrated solution of urea at a temperature a little higher than its set point while continuing the agitation of the mass until granules are obtained, then drying the granules at a temperature of at most 120° C.

By "agitation" as used in this specification is meant a process in which substantially continuous movement is imparted to solid particles in suitable mixing apparatus, for example in a paddle mixer. Other mixing devices which are suitable for use in the process of the present invention include drum granulators and mixers of the type generally known as ribbon mixers.

The proportions by weight of urea as solution or melt to urea in substantially dry particulate form may be varied over a wide range but in general should not be less than 0.25:1 and not more than 3:1. It is preferred however to use proportions in the range of 0.4:1 to 0.7:1.

The concentration of the solution or melt of urea employed may also be varied over a wide range but it has been found convenient to use concentrations of not less than 60% by weight and particularly a concentration of substantially 85%. The solution or melt of urea is conveniently introduced into the agitated mass of substantially dry particulate urea by means of one or more small bore pipes or nozzles discharging a fine stream or streams of the solution onto the agitated mass, the pipes or nozzles being positioned above the agitated mass at such a distance that the stream or streams of solution or melt of urea break up into droplets before reaching the agitated mass.

It is desirable to make provision for cooling the vessel in which the agitation and granulation are carried out, for example by providing the vessel with a jacket through which cooling fluid may be passed. It has been found that the size grading of urea granules produced by the process of the present invention may be effectively controlled by selection of the proportions by weight of urea as solution or melt to urea in substantially dry particulate form, of the concentration of the solution or melt, of the size and number of streams by which the solution or melt is added to the agitated mass and the temperature at which the agitation and granulation are carried out. The temperature at which the agitation and granulation are effected also determines the extent of the subsequent drying of the granules.

Suitable jacket temperatures may be such as to give a temperature of the agitated mass within the range of 10° C. to 90° C. and preferably less than 60° C., due regard being taken of the temperature of the solution or melt of urea.

In general the proportions of urea as solution or melt to urea in substantially dry particulate form, the concentration and temperatures of the solution or melt, and the temperature at which the agitation and granulation are carried out, will be chosen so that the moisture content of the granules produced before drying, will not be more than about 7% by weight.

In the subsequent drying, which may be carried out for example in one or more rotary dryers, it is desirable for the moisture content to be reduced in stages, for example to 3% or less by weight using moderate drying temperatures, for example temperatures in the range of 50° C. to 60° C., after which the remaining moisture is reduced to less than 1% and preferably to less than 0.1% by weight by employing higher drying temperatures in the range of 60° C. to 120° C.

The process of the present invention may be operated either batchwise or continuously.

In starting the process, the substantially dry particulate urea employed may conveniently be in the form of small crystals. Thereafter the substantially dry particulate urea may comprise, at least in part, the fines from the screening of the dried granules and/or the material obtained by suitable crushing of oversize granules. The fines and/or material obtained by crushing oversize granules are preferably cooled before being returned to the mixer.

In operating the process continuously it may be arranged by appropriate selection of the temperature at which the agitation and granulation are carried out for the quantity of fines and/or crushed oversize granules to be at least sufficient to provide the substantially dry particulate urea required to maintain continuous operation. Any excess of fines and/or crushed oversize granules may be dissolved and returned to the process as part of the solution or melt of urea.

The following examples are given by way of illustrating the carrying out of the process of the present invention; in Example 1 by operating in continuous manner and in Examples 2 and 3 by operating batchwise.

*Example 1*

Into a paddle mixer there was continuously charged, at the rate of 15 kilograms per hour, substantially dry urea having a particle size less than British standard sieve No. 16 (1003$\mu$), and there was continuously discharged onto the agitated mass in four streams from 0.75 mm. diameter nozzles, at a total rate of 7.5 kilograms per hour, a melt containing 85% by weight of urea at a temperature of 100° C.

The paddle mixer was provided with a jacket through which cooling liquid at a temperature of 25° C. was passed at a rate to maintain the temperature of the agitated mass of urea in the mixer at about 50° C.

The granules leaving the paddle mixer passed through a rotary drier in which they were dried by a stream of hot gas which entered the drier at a temperature of 105° C.

The resulting granular product, at the rate of 21.5 kilograms per hour, comprised 54% by weight of granules greater than No. 16 British standard sieve (1003$\mu$) and after crushing and re-screening the fraction greater than No. 6 British standard sieve (2812$\mu$), there was obtained 38% by weight of granules grading between No. 16

(1003μ) and No. 6 British standard sieves. The fines, i. e. the fraction less than No. 16 British standard sieve (1003μ), were continuously returned to the paddle mixer with sufficient fine crystalline urea to make up the total quantity of 15 kilograms per hour.

*Example 2*

10 kilograms of substantially dry urea having a particle size less than No. 16 British standard sieve (1003μ) were charged to a horizontal drum, the drum set in rotary motion and 7.5 kilograms of a melt containing 85% by weight of urea at a temperature of 105° C. were discharged onto the agitated mass through ten 0.8 mm. diameter nozzles over a period of 30 minutes, the rotation of the drum being stopped immediately after the melt addition was completed.

Screening of the product gave 11 kilograms of granules greater than No. 16 British standard sieve (1003μ), which were subsequently dried at a temperature of 100° C. In this example no measures were taken to control the temperature of the mass during the agitation.

*Example 3*

8 kilograms of substantially dry urea of a particle size less than No. 16 British standard sieve (1003μ) were charged into a ribbon mixer, the mixer set in motion and 4 kilograms of a melt containing 85% by weight of urea at a temperature of 105° C. were continuously discharged onto the agitated mass through four 2 mm. diameter nozzles over a period of five minutes and the mixer blades allowed to rotate for 15 seconds after the addition of the melt had been completed.

On screening the product 5 kilograms of granules greater than No. 16 British standard sieve (1003μ) were obtained which were dried at a temperature of 105° C.

In this example also no measures were taken to control the temperature of the mass during the agitation.

The granules of substantially pure urea produced by the process of the present invention have good mechanical properties, are free-flowing and are in general suitable for use in all cases where previously it has been customary to use crystalline urea.

A further advantage of the process of the present invention is that the colour (in Hazen units) and the turbidity of solutions prepared from the granules produced compare favourably with those of solutions of the urea initially fed to the mixer.

We claim:

A process for the production of substantially pure urea in free-flowing granular form which comprises discharging onto the surface of an agitated mass of substantially dry particulate urea having a temperature within the range of 10° C. to 90° C., droplets of a solution of urea having a concentration of at least 60% by weight, the proportions of urea as solution to urea in substantially dry particle form being in the range of 0.25:1 to 3:1, continuing the agitation of said mass until granules are obtained and then drying said granules in stages by reducing the moisture content thereof to at most 3% using a temperature within the range of 50° C. to 60° C., and thereafter reducing the moisture content to at most 1% using a temperature within the range of 60 to 120° C.

References Cited in the file of this patent

UNITED STATES PATENTS

| | | |
|---|---|---|
| 2,436,766 | Davis | Feb. 24, 1948 |
| 2,436,771 | Hood | Feb. 24, 1948 |